United States Patent Office 3,265,564
Patented August 9, 1966

3,265,564
METHODS FOR PROTECTING PLANTS AND SEEDS FROM FUNGI
Richard M. Scribner, Wilmington, Del., and Edward J. Soboczenski, Chadd's Ford, Pa., assignors to E. I. du Pont de Nemours and Company, Wilmington, Del., a corporation of Delaware
No Drawing. Filed Feb. 11, 1964, Ser. No. 343,969
15 Claims. (Cl. 167—30)

This application is a continuation-in-part of our copending application Serial No. 265,054, filed March 14, 1963, now abandoned.

This invention relates to the use of chemicals as soil pesticides.

More specifically, it refers to a method for protecting plants from soil pests by applying to soil a plant protectant amount of a substituted dimethoxybenzene or substituted ethoxymethoxybenzene.

We have discovered that such compounds possess outstanding plant protectant activity and show no apparent phytotoxicity to crop plants, fruit trees and ornamentals when applied to the soil.

The plant protectant compounds of our invention are structurally defined as follows:

(1) 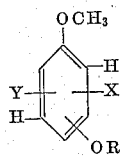

wherein
R is $CH_3$ or $CH_2CH_3$;
X is F, Cl, Br, $OCH_3$, $CH_3$ or $CH_2CH_3$; and
Y is F, Cl, Br or $CH_3$.

A particularly preferred group of compounds are:

(2) 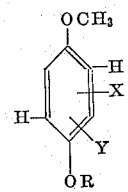

wherein
R has the same meaning as above;
X is Cl, Br, $CH_3$ or $C_2H_5$; and
Y is Cl, Br or $CH_3$.

The outstanding individual compounds are: 1,4-dichloro-2,5-dimethoxybenzene and 4-chloro-2,5-dimethoxytoluene.

Soil fungi which are particularly well controlled by the compounds used in this invention include: Rhizoctonia spp., Fusarium spp., Sclerotinia spp., Pythium spp., and Thielaviopsis spp.

Many of the compounds of Formula 1 above also protect plants from the ravages of nematodes as well as soil fungi.

PREPARATION

The substituted dimethoxybenzenes of Formula 1 above can be prepared by several methods. For example, halogenated 1,4-dimethoxybenzene and 2,5-dimethoxytoluenes are prepared by reacting hydrochloric acid or hydrobromic acid (HX) with quinone or 2-methylquinone to form the corresponding monohalogen substituted hydroquinone. Subsequent oxidation of the monohalohydroquinone gives the corresponding monohaloquinone. This is easily reacted with another equivalent of HX which is the same or different from the one initially used to give a dihalogen substituted hydroquinone. Methylation of a halogenated hydroquinone with diazomethane directly, or as an alkaline solution with dimethyl sulfate gives an essentially quantitative yield of the corresponding halogenated 2,5-dimethoxybenzene and toluene.

Stepwise, alkylation in the presence of alkali with one mole of ethylbromide and then with one mole of dimethylsulfate gives a good yield of the corresponding methoxyethoxy halogenated benzene.

Direct chlorination or bromination of dihydroxy-toluenes or dihydroxybenzenes also provides halogenated dihydroxybenzenes or toluenes which are easily methylated as described above to give the products used in this invention. The alternative use of chlorine and bromine gives the corresponding chloro, bromo-substituted analogs. Dimethoxybenzenes and dimethoxytoluenes can also be reacted directly with chlorine and bromine.

A mixed isomeric dichlorodimethoxybenzene can be prepared by subjecting 1,2,4,5-tetrachlorobenzene to hydrolysis using four moles of sodium hydroxide in methanol solvent per mole of the tetrachloro compound. The resulting dichlorodihydroxybenzene disodium salt can be methylated to produce a dichlorodimethoxybenzene.

Sulfuryl halides, particularly sulfuryl chloride, can be reacted with 1,4-dialkoxybenzene to give essentially pure 1,4-dichloro-2,5-dialkoxybenzene. With 1,3-dimethoxybenzene, sulfuryl halides give the 1,5-dihalogen substituted 2,4-dimethoxybenzene isomer in high yield. Similarly, essentially pure 1,2-dihalogen substituted 4,5-dimethoxybenzene can be obtained by reacting veratrol with, for example, sulfuryl chloride. Alternatively, the dihydric phenols or dihydroxytoluenes can be reacted with sulfuryl halides followed by etherification with dimethylsulfate or diethylsulfate.

p-Xyloquinone is readily reduced by the usual chemical or catalytic methods to yield 1,4-dihydroxy-2,5-dimethylbenzene. This compound can be etherified in alkaline solution with dimethylsulfate or stepwise with dimethylsulfate and ethyl bromide.

p-Benzoquinone will react with alcohols, such as methanol, in the presence of mineral acid. The product of this reaction is 1,4-dihydroxy-2-methoxybenzene. This compound may be etherified by the above methods to give a trialkoxybenzene, which can then be halogenated with chlorine, bromine or a sulfurylhalide to give a 1-halo-2,4,5-trialkoxybenzene.

Those compounds where it is desirable to have an ethyl group directly attached to the benzene ring can be obtained from the appropriately ethyl substituted benzene or quinone. Alternatively the ethyl group can be introduced by Friedel-Crafts alkylation, or Friedel-Crafts acylation followed by Clemmenson reduction.

A particularly useful procedure for getting the fluorine substituent into the dialkoxybenzene compounds used in this invention comprises diazotizing the corresponding dialkoxyaniline or dialkoxytoluidine and adding fluoboric acid. Heating the corresponding diazonium fluoborate gives the corresponding monofluorine substituted dialkoxybenzene or dialkoxytoluene. The latter compounds can be treated with bromine, chlorine, or a sulfuryl halide to give the corresponding polyhalogen substituted compounds of this invention. Nitration, for example, of a monofluorodimethoxybenzene, reduction of the nitro-substituent followed by the diazonium fluoborate treatment is a convenient method which can provide the corresponding difluorodimethoxybenzenes.

Our invention contemplates use of mixtures of compounds corresponding to Formula 1 above, as well as to the use of single compounds. For example, technical grade 2,5-dichlorohydroquinone can be methylated directly, without further purification, with diazomethane or as an alkaline solution with dimethylsulfate to give a highly effective soil pesticidal mixture of about 75% 1,4-dichloro-2,5-dimethoxybenzene.

COMPOSITIONS

Plant protectant compositions of this invention comprise one or more compounds of Formula 1 and one or more surface-active agents.

The surface-active agent or surfactant can include any of the anionic, cationic and non-ionic surface-active agents. Suitable surface-active agents are set out, for example, in Searle U.S. Patent 2,426,417; Todd U.S. Patent 2,655,447; Jones U.S. Patent 2,412,510; or Lenher U.S. Patent 2,139,276. A detailed list of such agents is set forth in "Detergents and Emulsifiers Annual" (1963) by John W. McCutcheon, Inc., and Bulletin E–607 of the Bureau of Entomology and Plant Quarantine of the U.S. Department of Agriculture.

Among the more preferred surfactants are those anionic and non-ionic agents recognized in the art as wetting agents, detergents or emulsifiers. Among the anionic surfactants, preferred ones are alkali metal or amine salts of alkyl benzene sulfonic acids such as dodecylbenzene sulfonic acid, sodium lauryl sulfate, alkyl naphthalene sulfonates, sodium - N - methyl-N-oleoyltaurate, oleic acid ester of sodium isocyanate, diacetyl sodium sulfosuccinate and sodium dodecyldiphenyl oxide disulfonate. Among the non-ionic compounds, the preferred members are alkyl phenoxy poly(ethyleneoxy)ethanols such as nonyl phenol adducts with ethylene oxide; trimethyl nonyl polyethylene glycol esters, polyethylene oxide adducts of fatty and rosin acids, long chain alkyl or mercaptan adducts with ethylene oxide.

Surfactants can be present in compositions in this invention in the range of 0.1 to 20% by weight. However, it is preferred to use 0.2 to 10% by weight of surfactant.

Low strength compositions containing 1 to 5% by weight of a compound of Formula 1 can contain, with or without surfactant present, common liquid solvents such as alcohols, ketones, chlorinated hydrocarbons, Cellosolves, aliphatic and aromatic hydrocarbons and N,N-dialkyl amides. Preferred liquid solvents include xylene, alkylated naphthalene, cyclohexane, cyclohexanone, chloroethanes and dimethyl formamide. These low strength compositions containing one or more of the above-mentioned solvents can be used for direct application to the soil.

Additionally, a compound of Formula 1 can be formulated into emulsifiable solutions containing 10 to 50% of active by weight plus solvent and emulsifiers to make up 100%. The solvents can be water insoluble. Typical of the solvents used are higher ketones, higher aliphatic and aromatic hydrocarbons, chlorinated hydrocarbons and the like. Preferably, alkylated naphthalene, xylene, isophorone, decane or cyclohexanone alone or in combination is used.

Emulsifying agents most suitable for the compositions of this invention are alkyl aryl polyethoxy alcohols, alkyl and alkyl aryl polyether alcohols, polyoxyethylene sorbitol or sorbitan fatty acid esters, polyethylene glycol fatty esters, fatty alkylol amide condensates, amine salts of fatty alcohol sulfates plus long chain alcohols and oil soluble petroleum sulfonates.

Additional compositions can be formulated by adding a free-flowing inert powder to the active agent.

Free-flowing inert powders can be any of the agricultural extenders commonly employed in the fungicide art. They can include inert finely divided diluents such as natural clays, including attapulgite or kaolinite, diatomaceous earth, pyrophyllite, talc, synthetic mineral fillers derived from silica and silicates such as synthetic fine silica and synthetic calcium or manganese silicate, carbonates, phosphates and sulfates, sulfur, lime and flours such as wood, walnut shell, redwood, soybeans and cottonseed.

Dust compositions contain 1 to 30% by weight of the active ingredient. However, 3 to 15% by weight is preferred.

Particle size of the extender can vary considerably but will ordinarilly be somewhat under 50 microns in the finished formulation. Ureas and other fertilizers can be added to dust formulations to bring the concentration of active ingredient present down to 0.5 to 5% by weight of the total formulation.

In powdered compositions the active compound can be combined with the powder to form granules. Such granules can be prepared by spraying concentrated wettable powder slurries or solutions of the active ingredient in a liquid carrier over the surface of preformed clay granules or expanded vermiculite. It is also possible to mix finely divided clays with the finely divided halogenated dialkoxybenzenes and toluenes of this invention, moisten the mixture and then granulate. In these compositions, the active compound ordinarily will be present at the rate of 1 to 25% by weight. However, 3 to 15% by weight is the preferred.

In wettable powder compositions containing the active ingredient, one or more surfactants and a free-flowing dust made up of small particles of the above-described powders, the active compound will ordinarily be present in a concentration in the range of 25 to 85% by weight. Surfactants will be present in a range from 0.1 to 10% by weight to obtain adequate wetting and dispersion in water, with the remainder being one or more of the finely divided diluents shown above.

Wettable powders are prepared by mixing the ingredients in a blender and grinding the mixture in a hammer mill, air-impact mill or the like until the particle size has been reduced to make spray application practical and easy.

Compositions of this invention can additionally contain known fungicides. Illustrative of some of these fungicides are:

p-Dimethylaminobenzenediazo sodium sulfonate;
Quinone oxyaminobenzooxohydrazone;
Tetraalkyl thiuram sulfides such as tetramethyl thiuram monosulfide or disulfide and tetraethyl thiuram monosulfide or disulfide;
Metal salts of ethylene bisdithiocarbamic acid, e.g. manganese, zinc, iron and sodium salts;
Pentachloronitrobenzene;
Dodecylguanidine acetate;
N-trichloromethylthiotetrahydrophthalimide (captan);
Phenylmercury acetate;
2,4-dichloro-6-(o-chloroaniline)-s-triazine;
N-methylmercury p-toluenesulfonanilide;
Chlorophenolmercury hydroxides;
Nitrophenolmercury hydroxides;
Ethylmercury acetate;
Ethylmercury 2,3-dihydroxypropyl mercaptide;
Methylmercury acetate;
Methylmercury 2,3-dihydroxypropyl mercaptide;
3,3'-ethylenebis(tetrahydro-4,6-dimethyl-2H-1,3,5-thiadiazine-2-thione);
Methylmercury dicyandiamide;
N-ethylmercury-p-toluenesulfonilide
Metal (e.g. iron, sodium and zinc), ammonium and amine salts of dialkyl dithiocarbamic acids;
Tetrachloronitroanisole;
Hexachlorobenzene;
Hexachlorophene;
Methylmercury nitrile;
Tetrachloroquinone; and
N-trichloromethylthiophthalimide.

The above fungicides are added to compositions containing the active ingredient used in this invention at the rate of 1 to 400 pounds to each 20 pounds of a compound within the scope of this invention. Illustrative of fungicides used at low rates with the active ingredients of this case are the above-described organo mercurials. Illustrative of fungicides used at high rates with the active ingredients of this case are thiuram sulfides and captan. Of course, more or less of the above-listed fungicides can be added to a halogenated dimethoxybenzene or to a halogenated dimethoxytoluene composition depending on the fungi present in the area to be protected.

Compositions of this invention can additionally contain soil insecticides such as chlordane, DDT, dieldrin, endrin, aldrin, methoxychlor and others for control of insects in the soil. From 0.1 to 10 parts by weight of the insecticide is used for each one part by weight of a compound of Formula 1.

Wettable powder formulations containing an insecticide and a compound of Formula 1 are blended with a diluent and a surfactant and then ground in a hammer mill to obtain intimately blended finely divided particles. This type formulation can be dispersed in water and sprayed in broadcast treatments followed by rotovation into the soil or sprayed in-the-furrow.

Dust compositions containing an insecticide and a compound of Formula 1 can be prepared by blending with a diluent and grinding in a hammer mill. These dust compositions can be applied to the soil in conventional dusting equipment in broadcast treatments, in-the-row treatments or as a hopper-box treatment as part of a seeding operation.

Insecticides can also be combined with compounds of Formula 1 in emulsifiable compositions by dissolving the insecticide and a compound of Formula 1 in an inert solvent containing an emulsifier. These compositions are emulsified in water and applied to the soil much like the wettable powders above.

The plant protectant compositions of this invention can also contain nematocides such as "Nemagon" 1,2-dibromo-3-chloropropane and "D–D" mixture of dichloropropane and dichloropropene in order to protect plants from a broader spectrum of nematodes. The above nematocides are present in the range of 0.1 to 10 parts by weight for each one part by weight of a compound of Formula 1. These combinations can be formulated in a manner similar to the compositions described above.

The plant protectant activity of the compounds of Formula 1 found in some of the above mixtures appear to be enhanced by the presence of the second component. In other words better than additive results are obtained by applying some of the above compositions to soil containing both nematodes and fungi.

In addition compositions can contain special additives such as corrosion inhibitors, pigments, antifoam agents and the like.

APPLICATION

Compounds used in this invention can be sprayed directly or in formulations on or in the soil. Soil applications are applied at or before planting, as a side dressing to living plants, in-the-furrow, as a hopper-box treatment and as a soil drench. The dosage is from one-third of an ounce to 200 pounds of active ingredient per acre treated depending on method of application and soil type.

Good results are obtained by an in-the-row treatment. Spray is directed on a band approximately two to four inches wide in such a way as to strike the sides of the furrow as well as the bottom of the furrow. Seed can then be planted and the furrow closed. The seeds, seedlings and growing plants are protected from attack by soil fungi. Alternatively, compounds of this invention can be rotovated into this band. One-tenth to ten pounds of active ingredient per 12,000 feet of a two-inch wide row gives satisfactory plant protection against fungi.

A preferred dosage in-the-row because of exceptionally good protection from fungi at low cost is one-half to three pounds of active ingredient per 12,000 feet of a two-inch wide row. Obviously, if the band width treated is more or less than two inches the dosage rate is adjusted accordingly. In-the-row treatment is extremely useful in protecting seeds, newly-germinated seedlings and growing plants of corn, tomatoes, water-melon, squash, carrots, lettuce, cantaloupe, peppers, cucumbers, beams, cotton, tobacco, ornamentals and the like from attack by soil pests.

Soil drench treatments protect seeds, seedlings, and plants from the ravages of soil fungi by application of the compounds used in this invention at rates of about 20 to 100 pounds of active ingredient per acre.

Compounds used in this invention can also be mixed with cotton seeds in the hopper-box treatment at planting time at rates of one to fifty ounces of active ingredient per cwt. of seeds to give protection from soil fungi. A preferred rate because of excellent protection and low cost is two to sixteen ounces of active ingredient per cwt. of seeds. When cotton seeds are treated with compounds within the scope of this invention in the above-described manner, effective protection of the seeds, seedlings and growing plants is obtained against soil fungi.

In order that this invention can be better understood the following additional examples are provided. It should be understood that all percentages given are by weight unless otherwise specified.

Example 1

| | Percent |
|---|---|
| 1,4-dichloro-2,5-dimethoxybenzene | 75.0 |
| Synthetic fine silica | 10.0 |
| Fuller's earth | 12.5 |
| Sodium dioctyl sulfosuccinate | 0.5 |
| Sodium lignin sulfonate | 2.0 |

The above ingredients are blended and ground in a hammer mill to obtain a homogeneous mixture in which substantially all of the particles are 50 microns or less.

This wettable powder is mixed with water and rotovated into soil infested with the black root rot fungus *Thielaviopsis basicola*. The rate used is thirty pounds per acre of active ingredient. Tobacco seedlings planted in the treated soil are protected from attack by the fungus, resulting in a healthy crop of tobacco. Tobacco plants planted in untreated soil grow poorly resulting in less yield than from tobacco grown in treated soil.

Example 2

| | Percent |
|---|---|
| 1,4-dichloro-2,5-dimethoxybenzene | 25 |
| Alkylated naphthalene | 70 |
| Mixed polyoxyethylene ethers and oil soluble sulfonates | 5 |

The active ingredients and the emulsifier are added to the alkylated naphthalene in an agitated vessel which is provided with a steam jacket to make gentle heating possible. Heat and agitation are supplied until a homogeneous mixture is obtained which can be emulsified readily in water for spray application.

This formulation is emulsified in water and sprayed in an open furrow at one pound per acre of active ingredient. Bean seeds are planted in the treated furrow at the same time as the treatment is made and the furrow closed. The bean seeds germinate and the seedlings and growing plant are protected from attack by the fungus *Rhizoctonia solani* resulting in a healthy stand and good crop of beans. Bean seeds planted in untreated soil are essentially destroyed and the few plants that remain are severely diseased and produce a poor crop.

Example 3

The following product is prepared by blending the ingredients as listed below and then passing the mixture through a deagglomerator such as an Entoleter mill to obtain a finely divided dust in which the soil fungicides and soil insecticides are uniformly distributed throughout.

| | Percent |
|---|---|
| Wettable powder of Example 4 | 13.4 |
| Dieldrin 50% W.P. | 6.0 |
| Micaceous talc | 80.6 |

This mixture which contains 10% 1,4-dichloro-2,5-dimethoxybenzene and 3% active dieldrin is useful as a hopper box treatment for seeds such as cotton. For application ten pounds of this dust is mixed with a hundred weight of machine-delinted cotton seed for hopper box application at planting time. After planting these protected seeds germinate and the cotton seedlings and growing plants are protected from soil fungi such as Rhizoctonia spp. and Pythium spp. and from insects such as wireworms resulting in a healthy stand of cotton which produces an excellent yield of cotton per acre. Seeds not treated as above frequently do not germinate and those that do result in seedlings which are later attacked by the above fungi resulting in a poor crop of cotton.

*Example 4*

|  | Percent |
|---|---|
| 1,4-dichloro-2,5-dimethoxybenzene | 5 |
| Attapulgite clay | 15 |
| Kaolinite | 80 |

The active ingredient is blended with the attapulgite and ground in a hammer mill to obtain a concentrate which is then diluted into the finished dust by blending with the kaolinite followed by deagglomeration to obtain a uniform mixture.

This formulation is rotovated into soil infested with soil fungi such as Rhizoctonia spp., Pythium spp. and *Fusarium oxysporum* f. *lycopersici*. The rate used is thirty pounds per acre of active ingredient. Tomato plants planted in the treated soil are protected from attack by these soil fungi resulting in healthy plants and excellent yields of tomatoes. Tomato plants planted in untreated soil frequently damp off and those that survive have a high incidence of wilt resulting in poor plants.

*Example 5*

Soil fungicide granules are prepared by preparing the following mixture:

|  | Parts |
|---|---|
| 1,4-dichloro-2,5-dimethoxybenzene | 2 |
| Alkylated naphthalene | 4 |
| Polyoxyethylated alkyl phenol | 1 |

These ingredients form a homogeneous solution which is then sprayed over the surface of 93 parts of preformed and pre-screened clay granules containing substantially all of the granules in the fifteen to thirty mesh range. The granular product is then suitable for application in the standard granule applicators to soil prior to planting.

This formulation is rotovated into soil infested with soil fungi such as *Rhizoctonia solani* and Pythium spp. The rate used depending on soil type is from fifteen to sixty pounds per acre of active ingredient. Cucumber seeds are planted and subsequently grow and produce an acceptable crop. Cucumber seed planted in untreated soil frequently do not germinate and those that do are generally diseased resulting in reduced yields.

*Examples 6–9*

The following compounds are substituted one at a time for the 1,4-dichloro-2,5-dimethoxybenzene in Example 5 in like amount by weight. They are formulated and applied in like manner. Like results are obtained.

Example:
 6. 4-chloro-2,5-dimethoxytoluene
 7. 1,4-dimethoxy-2,5-dimethylbenzene
 8. 4-bromo-2,5-dimethoxytoluene
 9. 1-bromo-2,4,5-trimethoxybenzene

*Example 10*

|  | Percent |
|---|---|
| 1,4-dichloro-2,5-dimethoxybenzene | 30 |
| "Nemagon,"® 1,2-dibromo-3-chloropropane | 20 |
| Alkylated naphthalene | 45 |
| Mixed polyoxyethylene ethers and oil soluble sulfonates | 5 |

The active ingredient and the emulsifier are added to the alkylated naphthalene and "Nemagon"® in an agitator vessel. The contents of the vessel are agitated until a homogeneous mixture is obtained which can be emulsified readily in water for spray application. An application of 100 pounds per acre of this formulation can be rotovated with soil infested with Rhizoctonia spp., Pythium spp., *Fusarium oxysporum* f. *vasinfectum, Verticillium albo-atrum* and Meloidogyne spp. (root knot nematodes). Cotton planted in the treated soil is protected from the above pathogens resulting in healthy plants and an excellent yield of cotton. Cotton planted in untreated soil frequently damp-off and wilt.

Results obtained using this mixture are better than the individual additive effect of using each of the active ingredients separately at the same rate.

*Example 11*

|  | Percent |
|---|---|
| 1-bromo-4-chloro-2,5-dimethoxybenzene | 75.0 |
| Synthetic fine silica | 10.0 |
| Fuller's earth | 12.5 |
| Sodium dioctyl sulfosuccinate | 0.5 |
| Sodium lignin sulfonate | 2.0 |

The above ingredients are blended and ground in a hammer mill to determine a homogeneous mixture in which substantially all of the particles are 50 microns or less.

This wettable powder is mixed with water and drenched at active ingredient rates of 40 to 100 pounds per acre depending on soil type. The spray is directed along the row at the base of young cabbage seedlings growing in soil infested with the fungus Rhizoctonia spp. This treatment prevents the fungus from attacking the seedling until it grows into a resistant condition resulting in normal, healthy plants. Seedlings which do not receive this treatment frequently damp off from the fungus attack.

*Example 12*

4-fluoro-2,5-dimethoxytoluene is substituted for the 1-bromo-4-chloro-2,5-dimethoxybenzene of Example 11 in like amount by weight. It is formulated and applied in like manner. Like results are obtained.

*Example 13*

|  | Percent |
|---|---|
| 1,4-dibromo-2,5-dimethoxybenzene | 10.0 |
| Micaceous talc | 90.0 |

The ingredients are blended and ground in a hammer mill to provide a homogeneous free-flowing finely divided dust formulation.

This dust is useful as a hopper box treatment for seeds such as cotton. For application ten pounds of this dust is mixed with a hundred weight of machine-delinted cotton seed for hopper box application at planting time. After planting, the protected seeds germinate and the cotton seedlings and growing plants are protected from soil fungi such as Rhizoctonia spp. and Pythium spp. A healthy stand of cotton plants and an excellent yield of cotton is produced per acre. Seeds not treated as above frequently do not germinate. Those seed that do germinate result in seedlings which are later attacked by the above fungi resulting in a poor crop of cotton.

*Examples 14–15*

The following compounds are substituted one at a time for the 1,4-dibromo-2,5-dimethoxybenzene in Example 13 in like amount by weight. They are each formulated and applied in like manner. Like results are obtained.

Example:
 22. 4-chloro-2,5-dimethoxytoluene
 23. 1-chloro-2,4,5-trimethoxybenzene

Example 16

| | Percent |
|---|---|
| 1,5-dibromo-2,4-dimethoxybenzene | 50.0 |
| Synthetic fine silica | 22.5 |
| Fuller's earth | 25.0 |
| Sodium dioctyl sulfosuccinate | 0.5 |
| Sodium lignin sulfonate | 2.0 |

The ingredients are blended in a ribbon blender and then ground in a hammer mill to provide a homogeneous finely divided powder which disperses easily in water.

This wettable powder is mixed with water and rotovated into soil infested with the Pythium spp. and Rhizoctonia spp. The rate used in forty pounds per acre of active ingredient. Cucumber seeds planted in the treated soil are protected from attack by the fungi, resulting in healthy plants. Cucumber seed planted in untreated soil grow poorly resulting in less yield.

Example 17

| | Percent |
|---|---|
| 1,5-dichloro-2,4-dimethoxybenzene | 25.0 |
| Alkylated naphthalene | 70.0 |
| Mixed polyoxyethylene ethers and oil soluble sulfonates | 5.0 |

The active ingredient and the emulsifier are added to the alkylated naphthalene in a vessel equipped with an agitator. A homogeneous solution results.

This formulation is emulsified in water and sprayed in an open furrow at three pounds per acre of active ingredient. Bean seeds are planted in the treated furrow at the same time as the treatment is made and the furrow closed. The bean seeds germinate and the seedling and growing plant are protected from attack by the fungus *Rhizoctonia solani* resulting in a healthy stand and a good crop of beans. Bean seeds planted in untreated soil are essentially destroyed and the few plants that remain are severely diseased and produce a poor crop.

Example 18

| | Percent |
|---|---|
| 1,2-dibromo-4,5-dimethoxybenzene | 50.0 |
| Kaolinite clay | 47.0 |
| Methyl cellulose, low viscosity | 0.5 |
| Alkyl naphthalene sulfonic acid, sodium salt | 1.5 |
| Anhydrous disodium phosphate | 1.0 |

The ingredients are dry blended in a ribbon blender until a homogenous mixture is obtained. This mixture is then micropulverized until all the particles have a particle size substantially less than 50 microns.

This wettable powder is rotovated into soil infested with soil fungi such as *Fusarium oxysporum* f. *vasinfectum*. The rate used is thirty pounds per acre of active ingredient. Cotton seed are planted and subsequently grow and produce an acceptable crop of cotton. Cotton seed planted in untreated soil germinate but the seedlings and growing plants are infested with this wilt organism resulting in substantially reduced yields.

Example 19

| | Percent |
|---|---|
| 1,4-difluoro-2,5-dimethoxybenzene | 25.0 |
| Alkylated naphthalene | 70.0 |
| Mixed polyoxyethylene ethers and oil soluble sulfonates | 5.0 |

The active ingredient and the emulsifiers are added to the alkylated naphthalene in a vessel equipped with an agitator. After stirring, a homogeneous solution results.

This formulation is emulsified in water, sprayed and then rotovated into soil infested with soil fungi such as Rhizoctonia spp., Pythium spp. and *Fusarium oxysporum* f. *lycopersici*. The rate used is twenty pounds per acre of active ingredient. Tomato plants planted in the treated soil are protected from attack by these soil fungi resulting in healthy plants and excellent yields of tomatoes. Tomato plants planted in untreated soil frequently damp off and those that survive have a high incidence of wilt resulting in poor plants.

Examples 20–21

The following compounds are each substituted one at a time for the 1,4-difluoro-2,5-dimethoxybenzene of Example 19 in like amount by weight. They are each formulated and applied in like manner. Like results are obtained.

Example:

29. 1-ethoxy-4-methoxy-2,5-dichlorobenzene
    30. 1-chloro-4-ethyl-2,5-dimethoxybenzene

Example 22

| | Percent |
|---|---|
| 1-ethoxy-4-methoxy-2,5-dibromobenzene | 5 |
| Attapulgite clay | 15 |
| Kaolinite | 80 |

The active ingredient is blended with the attapulgite and ground in a hammer mill to obtain a concentrate which is then diluted into the finished dust by blending with the kaolinite followed by deagglomeration to obtain a uniform mixture.

This formulation is rotovated into soil infested with soil fungi such as Rhizoctonia spp., Pythium spp. and *Fusarium oxysporum* f. *lycopersici*. The rate used is thirty pounds per acre of active ingredient. Tomato plants planted in the treated soil are protected from attack by these soil fungi resulting in healthy plants and excellent yields of tomatoes. Tomato plants planted in untreated soil frequently damp off and those that survive have a high incidence of wilt resulting in poor plants.

Examples 23–57

The following compounds are each substituted one at a time for the 1-ethoxy-4-methoxy-2,5-dibromobenzene of Example 22 in like amount by weight. They are each formulated and applied in like manner. Like results are obtained.

Example:

23. 4-bromo-2,5-dimethoxy-1-ethylbenzene
    24. 4-fluoro-2,5-dimethoxytoluene
    25. 4-chloro-2,5-dimethoxytoluene
    26. 4-bromo-2,5-dimethoxytoluene
    27. 4-ethyl-2,5-dimethoxytoluene
    28. 1-bromo-2,4,5-trimethoxybenzene
    29. 1,4-dibromo-2,5-dimethoxybenzene
    30. 1-bromo-4-chloro-2,5-dimethoxybenzene
    31. 1-bromo-4-fluoro-2,5-dimethoxybenzene
    32. 1-chloro-4-fluoro-2,5-dimethoxybenzene
    33. 1,4-difluoro-2,5-dimethoxybenzene
    34. 1,4-dichloro-2-methoxy-5-ethoxybenzene
    35. 4-fluoro-2,5-dimethoxyethylbenzene
    36. 1,5-dichloro-2,4-dimethoxybenzene
    37. 1,5-dibromo-2,4-dimethoxybenzene
    38. 1-bromo-5-chloro-2,4-dimethoxybenzene
    39. 1,4-dimethyl-2,5-dimethoxybenzene
    40. 1,2-dichloro-4,5-dimethoxybenzene
    41. 1,2-dibromo-4,5-dimethoxybenzene
    42. 2-chloro-4,5-dimethoxytoluene
    43. 1-chloro-2-fluoro-4,5-dimethoxybenzene
    44. 1-chloro-5-fluoro-2,4-dimethoxybenzene
    45. 4-chloro-2,5-dimethoxytoluene
    48. 4-bromo-2,5-dimethoxytoluene
    47. 1-fluoro-2,4,5-trimethoxybenzene
    48. 2-ethoxy-5-methoxy-p-xylene
    49. 5-chloro-2,4-dimethoxyethylbenzene
    50. 1-bromo-5-fluoro-2,4-dimethoxybenzene
    51. 1-chloro-2,4,5-trimethoxybenzene
    52. 1-methyl-2,4,5-trimethoxybenzene
    53. 1-bromo-4-chloro-2-ethoxy-5-methoxybenzene
    54. 1,5-dichloro-2-ethoxy-4-methoxybenzene 55. 1,2-dichloro-4-ethoxy-5-methoxybenzene
56. 2-bromo-4,5-dimethoxytoluene
57. 5-fluoro-2,4-dimethoxytoluene

*Example 58*

|  | Percent |
|---|---|
| 1,4-dichloro-2,5-dimethoxybenzene | 70.0 |
| Diazinon or parathion | 5.0 |
| Synthetic fine silica | 10.0 |
| Fuller's earth | 12.5 |
| Sodium dioctyl sulfosuccinate | 0.5 |
| Sodium lignin sulfonate | 2.0 |

This formulation is prepared and applied in the manner of the formulation of Example 1. It protects tobacco plants from attack by fungi and wireworms.

*Example 59*

|  | Percent |
|---|---|
| 1,5-dichloro-2,4-dimethoxybenzene | 12.5 |
| Dieldrin | 12.5 |
| Alkylated naphthalene | 70.0 |
| Mixed polyoxyethylene ethers and oil soluble sulfonate | 5.0 |

This formulation is prepared as described for Example 17 above.

It is emulsified in water and sprayed in an open furrow at 6 pounds per acre of total active ingredient. Bean seeds are planted in the treated furrow at the same time as the treatment is made and the furrow closed. The bean seeds germinate and the seedling and growing plants are protected from attack by both the fungus, *Rhizoctonia solani* and the soil insect, wireworm. A healthy stand of beans results. Bean seeds planted in untreated soil are essentially destroyed and those which remain are severely diseased and produce a poor crop.

*Example 60*

|  | Percent |
|---|---|
| 1,4-dichloro-2,5-dimethoxybenzene (technical) | 78.9 |
| Marasparse CB (partially desulfonated sodium lignin sulfonates) | 1.0 |
| Alkanol B (sodium alkylnaphthalene sulfonate) | 3.0 |
| Barden clay (kaolinite clay) | 17.1 |

The above ingredients are blended thoroughly and then micropulverized until the particle size is substantially less than 50 microns.

It is broadcast at rates of 20 pounds of active ingredients per acre in an area heavily infested with root rotting pathogens. The material is rotovated thoroughly into the soil and planted with acid delinted, untreated cotton seeds. An excellent stand of cotton plants is obtained.

*Example 61*

|  | Percent |
|---|---|
| 1,4-dichloro-2,5-dimethoxybenzene | 76.5 |
| Marasparse C (partially desulfonated sodium lignin sulfonate) | 2.0 |
| Alkanol B (sodium alkylnaphthalene) | 1.0 |
| Dextrin | 6.0 |
| Attapulgite clay | 14.5 |

The above ingredients are prepared into a usable formulation and used as described in Example 60 with similar results.

*Example 62*

|  | Percent |
|---|---|
| 1,4-dichloro-2,5-dimethoxybenzene | 37.5 |
| Tetramethylthiuram disulfide | 12.5 |
| Kaolinite clay | 47.0 |
| Low viscosity methyl cellulose | 0.5 |
| Alkyl naphthalene sulfonic acid, sodium salt | 1.5 |
| Anhydrous disodium phosphate | 1.0 |

The above ingredients are blended and ground in a hammer mill to obtain a homogeneous mixture in which substantially all the particles are 50 microns or less.

This wettable powder is mixed with water and sprayed in an open furrow at time of planting cotton seed in soil infested with the fungus Pythium spp. The rate used is 2 pounds of active ingredients, namely the dimethoxybenzene and thiuram admixed, per 12,000 feet of row. The cotton seed germinates and the growing plants remain free of disease resulting in a fine crop of cotton. Cotton seed planted in untreated soil is frequently killed by the fungi before it germinates and the surviving plants are severely diseased. Extremely poor yields result.

Better results are obtained from the combined mixture than from the individual additive effect of the respective dimethoxybenzene and thiuram active ingredients.

The invention claimed is:

1. A method for protecting plants from attack by soil fungi comprising applying to said fungi a plant protectant amount of a compound of the formula:

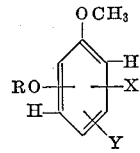

wherein
R is selected from the group consisting of methyl and ethyl;
X is selected from the group consisting of fluorine, chlorine, bromine, methyl, ethyl, and methoxy; and
Y is selected from the group consisting of fluorine, chlorine, bromine and methyl.

2. A method for protecting plants from soil fungi comprising applying to soil a plant protectant amount of a compound of the formula:

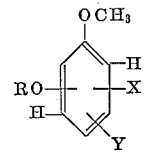

wherein
R is selected from the group consisting of methyl and ethyl;
X is selected from the group consisting of fluorine, chlorine, bromine, methyl, ethyl and methoxy; and
Y is selected from the group consisting of fluorine, chlorine, bromine and methyl.

3. A method for protecting plants from soil fungi comprising applying to soil a plant protectant amount of 1,4-dichloro-2,5-dimethoxybenzene.

4. A method for protecting plants from soil fungi comprising applying to soil a plant protectant amount of 4-chloro-2,5-dimethoxytoluene.

5. A method for protecting plants from soil fungi comprising applying to soil a plant protectant amount of 1,2-dichloro-4,5-dimethoxybenzene.

6. A method for protecting plants from soil fungi comprising applying to soil a plant protectant amount of 1-bromo-2,4,5-trimethoxybenzene.

7. A method for protecting plants from soil fungi comprising applying to soil a plant protectant amount of 1-chloro-2,4,5-trimethoxybenzene.

8. A method for protecting plants from soil fungi comprising applying to soil a plant protectant amount of 1-bromo-4-chloro-2,5-dimethoxybenzene.

9. A method for protecting plants from soil fungi comprising applying to soil a plant protectant amount of 4-bromo-2,5-dimethoxytoluene.

10. A method for protecting plants from soil fungi comprising applying to soil a plant protectant amount of 1,4-dibromo-2-ethoxy-5-methoxybenzene.

11. A method for protecting plants from soil fungi comprising applying to soil a plant protectant amount of 2,5-dimethoxy-p-xylene.

12. A method for protecting plants from soil fungi comprising applying to soil a plant protectant amount of 4-ethyl-2,5-dimethoxytoluene.

13. A method for protecting plants from soil fungi comprising applying to soil a plant protectant amount of 1-bromo-4-ethyl-2,5-dimethoxybenzene.

14. A method for protecting plants from soil fungi comprising applying to soil a plant protectant amount of 1,4-dibromo-2,5-dimethoxybenzene.

15. A method of protecting cotton seeds from attack by fungi comprising applying to cotton seeds prior to planting, 1 to 50 ounces per 100 weight of seeds, a compound of the formula:

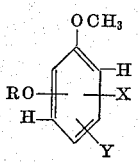

wherein
R is selected from the group consisting of methyl and ethyl;
X is selected from the group consisting of fluorine, chlorine, bromine, methyl, ethyl, and methoxy; and
Y is selected from the group consisting of fluorine, chlorine, bromine and methyl.

References Cited by the Examiner

UNITED STATES PATENTS

| | | | |
|---|---|---|---|
| 2,615,823 | 10/1952 | Lawlor et al. | 167—30 |
| 2,813,101 | 11/1957 | Goodhue et al. | 167—30 |
| 3,162,689 | 12/1964 | Reifschneider | 167—30 |

JULIAN S. LEVITT, *Primary Examiner.*

S. J. FRIEDMAN, *Assistant Examiner.*